US011176095B2

(12) United States Patent
Kartoun et al.

(10) Patent No.: US 11,176,095 B2
(45) Date of Patent: Nov. 16, 2021

(54) SYSTEMS AND METHODS FOR DETERMINING DATA STORAGE HEALTH AND ALERTING TO BREAKDOWNS IN DATA COLLECTION

(71) Applicant: International Business Machines Corporation, Armonk, NY (US)

(72) Inventors: Uri Kartoun, Cambridge, MA (US); Kenney Ng, Arlington, MA (US); Tanya Rudakevych, Boston, MA (US); Yoonyoung Park, Cambridge, MA (US); Charalambos Stavropoulos, Hastings-on-Hudson, NY (US); Sophie Batchelder, Lancaster, PA (US); Veronica Aldous, Davie, FL (US); David Osofsky, Arlington, MA (US); Amy Chiu, San Francisco, CA (US); Francis Campion, Westwood, MA (US); Paul C. Tang, Los Altos, CA (US)

(73) Assignee: International Business Machines Corporation, Armonk, NY (US)

(*) Notice: Subject to any disclaimer, the term of this patent is extended or adjusted under 35 U.S.C. 154(b) by 380 days.

(21) Appl. No.: 16/288,618

(22) Filed: Feb. 28, 2019

(65) Prior Publication Data
US 2020/0278950 A1  Sep. 3, 2020

(51) Int. Cl.
*G06F 16/17* (2019.01)
*G06F 11/00* (2006.01)
(Continued)

(52) U.S. Cl.
CPC ........ *G06F 16/1734* (2019.01); *G06F 11/006* (2013.01); *G06F 11/3072* (2013.01);
(Continued)

(58) Field of Classification Search
CPC ............... G06F 16/1734; G06F 11/006; G06F 11/3072; G06F 16/252; G06F 2201/88;
(Continued)

(56) References Cited

U.S. PATENT DOCUMENTS 9,874,554 B1 * 1/2018 Schwartz ........... A61B 5/14532
2008/0133275 A1   6/2008 Haug et al.
(Continued)

OTHER PUBLICATIONS

Azeem Majeed, Josip Car, Aziz Sheikh; Accuracy and completeness of electronic patient records in primary care, Family Practice, vol. 25, Issue 4, Aug. 1, 2008, pp. 213-214, https://doi.org/10.1093/fampra/cmn047.
(Continued)

*Primary Examiner* — Cam Y T Truong
(74) *Attorney, Agent, or Firm* — Troutman Pepper Hamilton Sanders LLP (57) ABSTRACT

A system and associated method for assessing level of completeness of healthcare data storage based on collected data. The system includes a collection system, a measurement system, an expectation system, and an alerting system. In a method of assessing the health of stored data, the system collects real-time data from at least one data source, determines measurements for a plurality of parameters based on the collected data, and generates expectations for a future period of time for the plurality of parameters based on data analysis technique. The system also compares the expectations for the future period of time to subsequent measurements collected for that period of time to determine whether the subsequent measurements satisfy an expectation threshold and provide an alert to a client terminal. The alert is a result of the comparison of the expectations and the subsequent measurements and provides an assessment of data storage quality and alerts on anticipated deficiencies.

16 Claims, 5 Drawing Sheets

(51) Int. Cl.
    *G06F 11/30*     (2006.01)
    *G06N 3/08*      (2006.01)
    *G06F 16/25*     (2019.01)
(52) U.S. Cl.
    CPC ............ *G06F 16/252* (2019.01); *G06N 3/08* (2013.01); *G06F 2201/80* (2013.01); *G06F 2201/805* (2013.01); *G06F 2201/88* (2013.01)
(58) Field of Classification Search
    CPC .. G06F 2201/80; G06F 2201/805; G06N 3/08
    See application file for complete search history.

(56)                References Cited

U.S. PATENT DOCUMENTS

| 2009/0240523 | A1* | 9/2009 | Friedlander | G06Q 10/10 |
| | | | | 705/2 |
| 2014/0297297 | A1* | 10/2014 | Head | G16H 50/20 |
| | | | | 705/2 |
| 2015/0193583 | A1 | 7/2015 | McNair et al. | |
| 2015/0347705 | A1* | 12/2015 | Simon | G16H 50/30 |
| | | | | 705/3 |
| 2017/0091406 | A1 | 3/2017 | Nguyen et al. | |
| 2017/0103174 | A1* | 4/2017 | Kim | G16H 40/63 |
| 2017/0329917 | A1* | 11/2017 | McRaith | G16H 10/20 |
| 2018/0197625 | A1* | 7/2018 | Lobach | G16H 50/30 |
| 2018/0232489 | A1 | 8/2018 | Fink et al. | |
| 2018/0247020 | A1* | 8/2018 | Itu | G16H 10/60 |
| 2020/0253547 | A1* | 8/2020 | Harris | A61B 5/7465 |

OTHER PUBLICATIONS

Weiskopf, N. G., Hripcsak, G., Swaminathan, S., & Weng, C. (2013). Defining and measuring completeness of electronic health records for secondary use. Journal of biomedical informatics, 46(5), 830-6.

"Opportunities and Challenges in Developing Deep Learning Models Using Electronic Health Records Data: A Systematic Review" Xiao C, Choi E, Sun J; Am Med Inform Assoc. (2018).

* cited by examiner

SYSTEMS AND METHODS FOR DETERMINING DATA STORAGE HEALTH AND ALERTING TO BREAKDOWNS IN DATA COLLECTION

TECHNICAL FIELD

The present application relates to assessments of data collection and, more particularly, to determining data storage health and alerting to breakdowns in data collection.

BACKGROUND

In many fields and industries, data storage and record-keeping are essential aspects of providing effective services. The healthcare field is one example where proper data entry and storage are used to provide safe and effective care to patients. Patient medical records provide important information that is used in future care and emergency situations, as well as in providing accurate diagnoses and treatment. Typical healthcare data elements include, for example, demographic details, laboratory test measurements, vital signs, procedure details, prescriptions given, and encounter types and lengths. Additional data elements include clinical narrative notes created by physicians and nurses. Other data elements include radiology images, CT scans, and MRIs.

Figure 5:
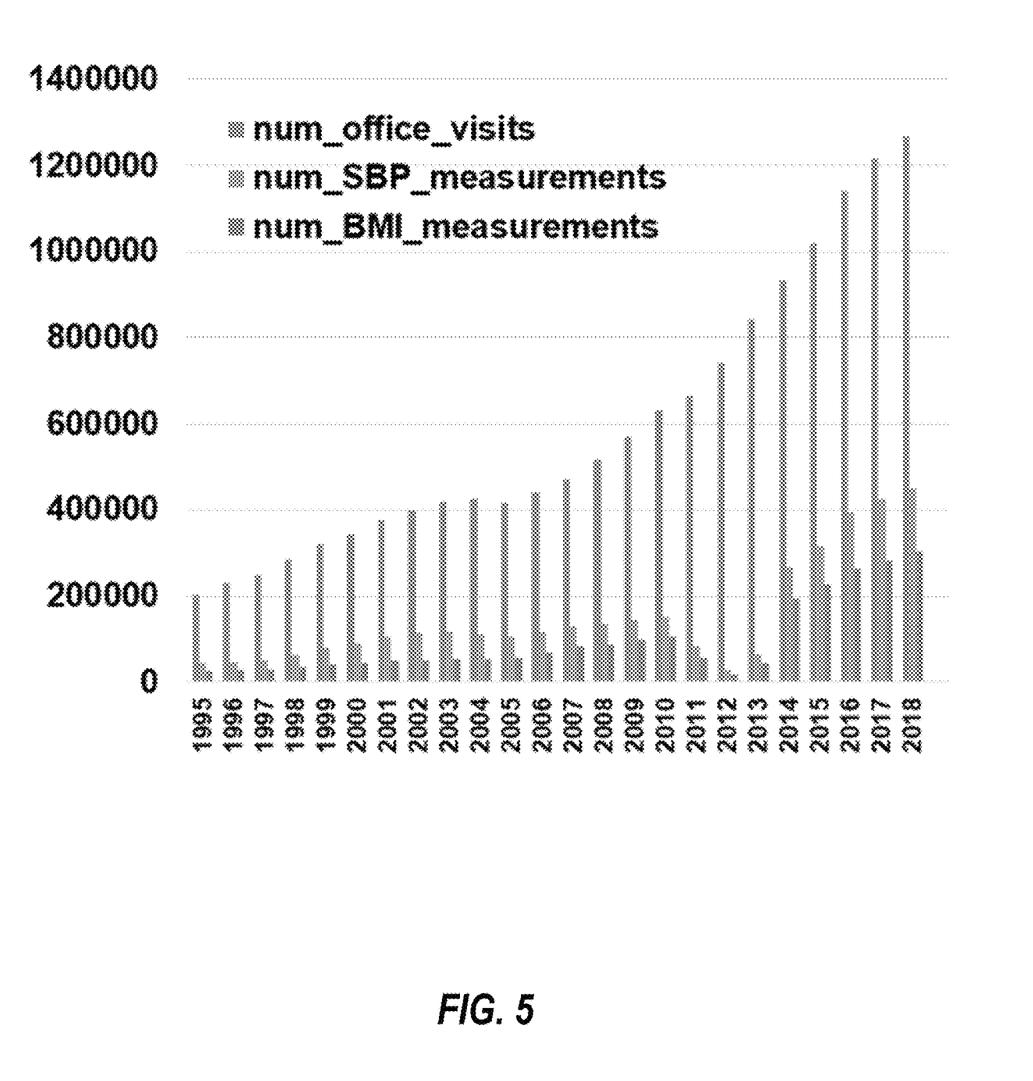
FIG. 5 is a bar graph showing collected data and illustrating an example of a data breakdown.

In certain scenarios a healthcare organization would assume that all data elements related to its patients are routinely and fully stored in designated databases. In reality, however, it could be that for a certain time the data is only partially stored. FIG. 5 provides an example of a data storage problem in which test result data for years 2011, 2012, and 2013 does not follow the trend related to the number of office visits (SBP=systolic blood pressure; BMI=body mass index). While this breakdown in data collection is easily visible when looking at the data well after the deficiency occurred, data correction for the deficient-documented years (e.g., for proper archiving purposes) may be costly or even impossible to correct.

In other instances, it could be the case that certain data elements are stored properly, but other data elements are lost. In another situation, certain data elements may be stored in a digital repository other than the one planned, and the technical personnel is not aware of the data misplacement. In these and other similar situations, it may be too costly or even impossible to recover or remedy the data loss by the time that it is discovered. Therefore, it is desirable to allow healthcare organizations to discover data health problems in real time, before a significant deterioration occurs.

The present disclosure is directed to overcoming these and other problems of the prior art.

SUMMARY

In some embodiments, a computer-implemented method for monitoring data storage health in a data processing system is disclosed. The data processing system includes a processing device and a memory comprising instructions which are executed by the processor to perform the method. The method includes collecting real-time data from at least one data source, determining measurements for a plurality of parameters based on the collected data, generating expectations for a future period of time for the plurality of parameters based on a time-series-analysis technique, comparing the expectations for the future period of time to subsequent measurements collected for that period of time to determine whether the subsequent measurements satisfy an expectation threshold, and providing an alert to a client terminal, the alert being a result of the comparison of the expectations and the subsequent measurements and indicating an assessment of data storage health.

In other embodiments, a data monitoring system for assessing data storage health is disclosed. The data monitoring system includes a collection system that collects real-time data from at least one data source, a measurement system that determines measurements for a plurality of parameters based on the collected data, the measurements including at least some amounts for parameters and at least some values for parameters, an expectation system that generates expectations for a future period of time for the plurality of parameters based on a data analysis technique (such as time-series-analysis), and an alerting system that compares the expectations for the future period of time to subsequent measurements collected for that period of time to determine whether the subsequent measurements satisfy an expectation threshold. The alerting system also provides an alert to an end-user device through a dashboard that is displayable by the end-user device based on a result of the comparison.

In other embodiments, a computer-implemented method for monitoring data storage health in a data processing system is disclosed. The data processing system includes a processing device and a memory comprising instructions which are executed by the processor to perform the method. The method includes collecting real-time healthcare data from at least one healthcare data source, determining measurements for a plurality of parameters based on the collected data, the measurements including an amount or value related to patient visits or test results, generating expectations for a future period of time for the plurality of parameters based on a cognitive software mechanism configured to predict future measurements based on the already-determined measurements, comparing the expectations for the future period of time to subsequent measurements collected for that period of time to determine whether the subsequent measurements satisfy an expectation threshold, providing an alert to an end-user device through a dashboard displayable by the end-user device, the alert being a result of the comparison of the expectations and the subsequent measurements and indicating an assessment of data storage health, receiving feedback from the client terminal, wherein the feedback includes an assessment of whether the alert correctly identified a problem with the collected data, and updating the cognitive software mechanism based on the feedback.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure relates to a system and method that analyzes a variety of data feeds in real-time and predicts if a certain data element type is stored at the same pace over time and with appropriate values. The system may use time-series-analysis techniques to make predictions regarding expected data. These techniques may range from a simple approach (e.g., moving average) to sophisticated approaches capable of identifying complex relations between data elements and the expectation (e.g., an artificial neural network). The system also tracks data feeds to make actual data measurements. The actual data measurements are compared to the expected data to determine whether there is a discrepancy.

In some embodiments, a data health monitoring system may generate a user interface dashboard that tracks the steps of a health analysis method and provides user tools for interacting with the process. The user tools may include an alerting tool for identifying situations in which actual data measurements are skewing too far from expected values such that a defect is suspected. The dashboard may include data visualizations that may allow a user to also check for and identify potential data health issues. Another user tool may enable a user to customize settings for the health monitoring system, such as to select a particular data analysis technique (such as time-series-analysis).

The data health monitoring system may have several practical applications, which may vary depending on the data type and desired monitoring capabilities. In a healthcare application, the data health monitoring system transforms the data collection into a quality assessment representation for identifying instances in which patient data may be deficient or suffering from a breakdown in reliability of storage or quality. In some instances, the more data that is collected, the greater the ability for the data health monitoring system to accurately assess the health of a data stream. To this end, the components of the data health monitoring system may be adapted to use sophisticated analysis techniques that perform a real-time analysis of a large datasets to determine expected value thresholds for identifying discrepancies within data streams in situations where manual review of the data would likely not identify a problem until much later and after a remedy is available and/or useful. The systems, methods, and functions are described herein in relation to a healthcare application, but it should be understood that other data streams may benefit from similar data health monitoring systems and methods.

Figure 1:
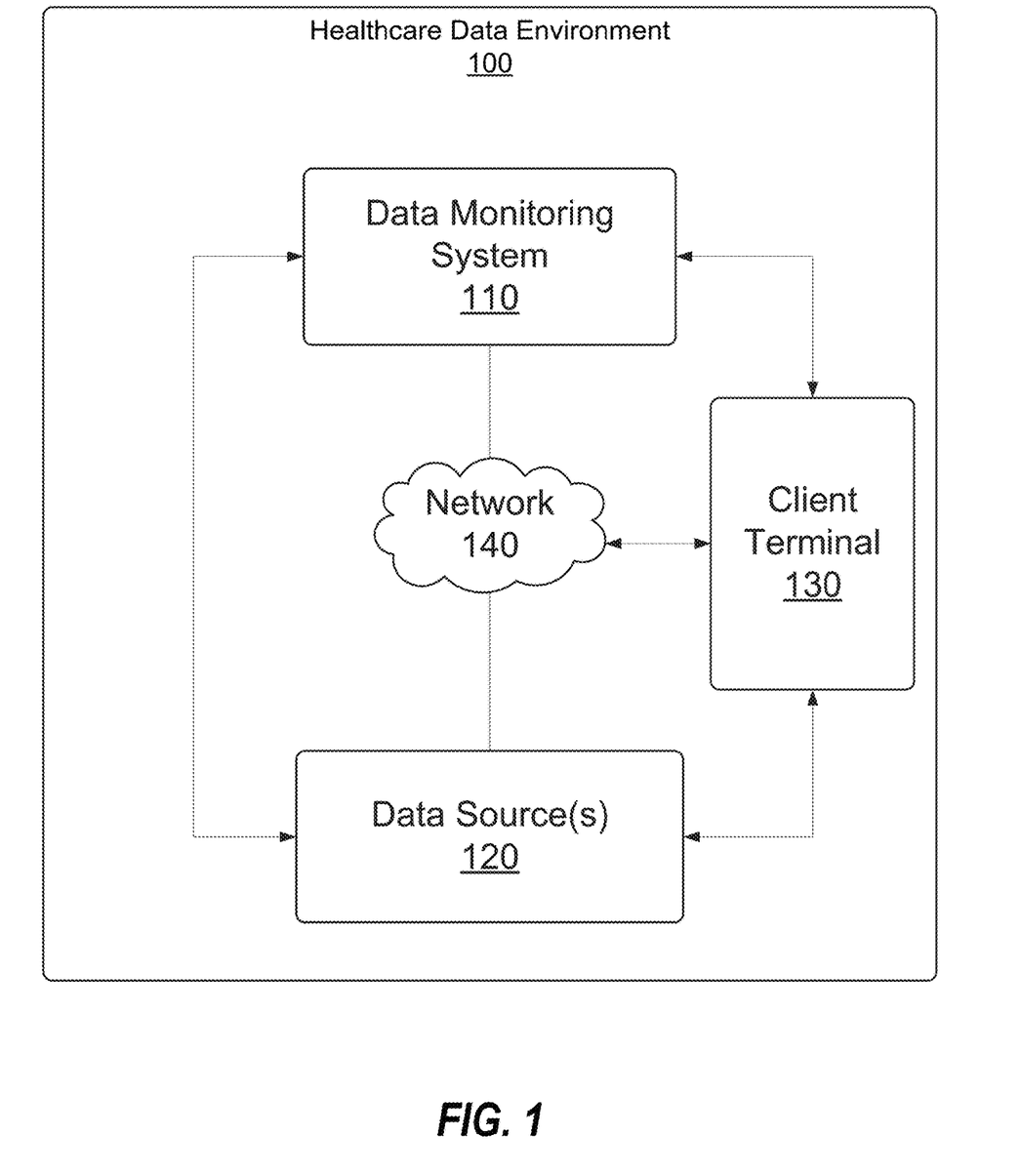
FIG. 1 is a block diagram of an example healthcare data environment, according to an embodiment.

FIG. 1 is an illustration of an exemplary healthcare data environment 100. The healthcare data environment 100 may include a data monitoring system 110, one or more data sources 120, and a client terminal 130. A network 140 may connect the data monitoring system 110, the one or more data sources 120, and/or the client terminal 130.

The data monitoring system 110 may be a computing device. The data monitoring system 110 may include components that enable data health monitoring functions. The one or more data sources 120 may be computing devices and/or storage devices configured to supply data to the data monitoring system 110. For example, the one or more data sources 120 may include a computing device having healthcare collection software associated with patient records, medical devices, etc. Examples of healthcare data that may be supplied by the one or more data sources 120 include, for example, patient visit data (e.g., number of visits, date of visit, reason for visit, location, time, length of visit, etc.), testing data (types of laboratory tests completed, result values etc.), medical professional notes (e.g., data input by a medical professional during a patient visit), administrative information, etc. The client terminal 130 may be a computing device, such as an end-user device (e.g., a desktop or laptop computer, mobile device, wearable device, smartphone, etc.). The client terminal 130 may communicate with the data monitoring system 110 in order to receive and produce a data health dashboard that is presented to a user.

The network 140 may be a local or global network and may include wired and/or wireless components and functionality which enable internal and/or external communication for components of the healthcare data environment. The network 140 may be embodied by the Internet, provided at least in part via cloud services, and/or may include one or more communication devices or systems which enable data transfer to and from the systems and components of the healthcare data environment 100.

In accordance with some exemplary embodiments, the data monitoring system 110, data source(s) 120, client terminal 130, or the related components include logic implemented in specialized hardware, software executed on hardware, or any combination of specialized hardware and software executed on hardware, for implementing the healthcare data environment 100 or related components. In some exemplary embodiments, the data monitoring system 110 or any of its components may be or include the IBM Watson™ system available from International Business Machines Corporation of Armonk, N.Y., which is augmented with the mechanisms of the illustrative embodiments described hereafter.

Figure 2:
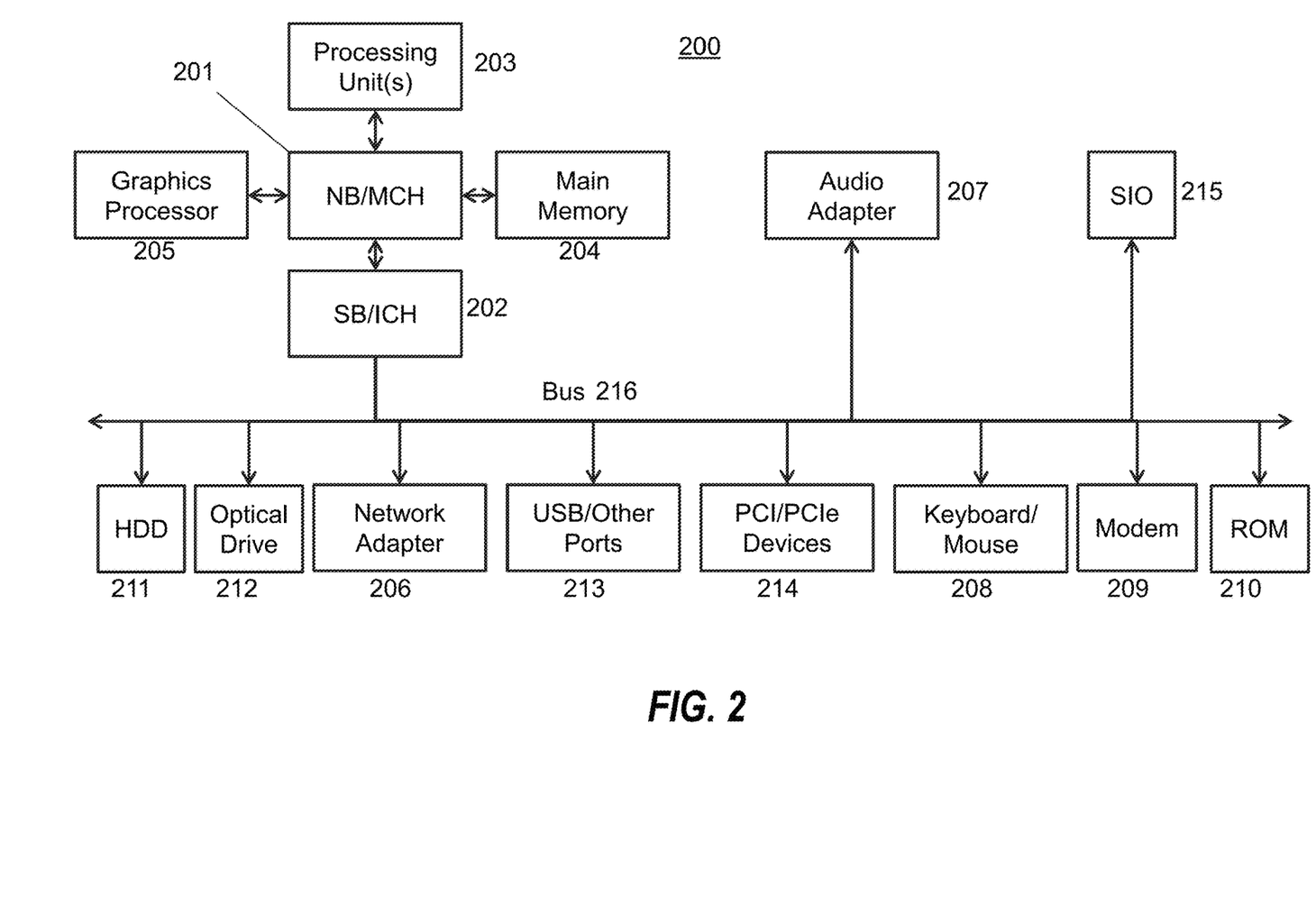
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, the data processing system 200 represents one or more of the data monitoring system 110, the one or more data sources 120, or the client terminal 130, and implements at least some of the functional aspects described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the data monitoring system 110, data source(s) 120, or client terminal 130. Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
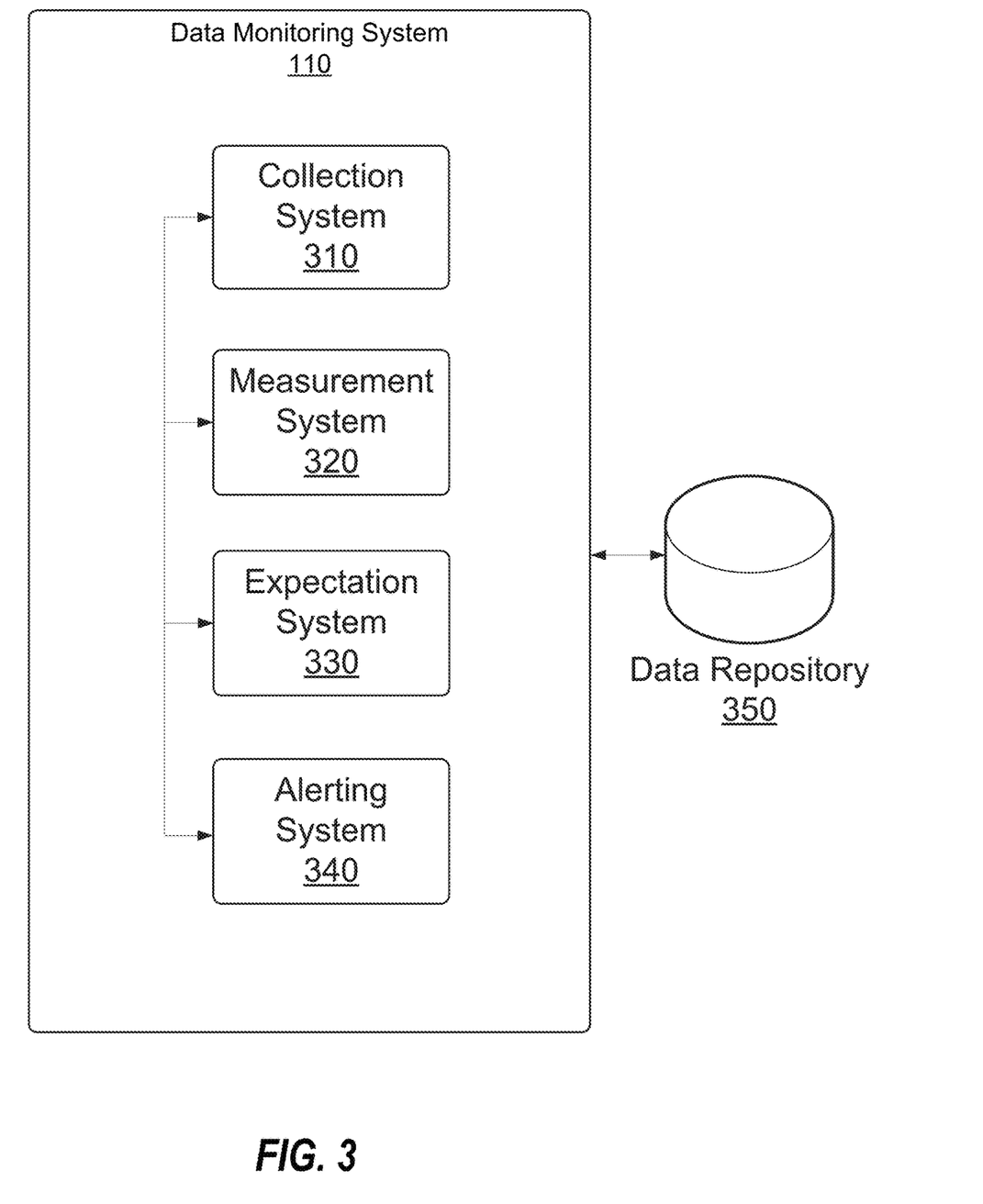
FIG. 3 is a block diagram of an example data monitoring system, according to an embodiment.

FIG. 3 illustrates an exemplary embodiment of the data monitoring system 110. In an exemplary embodiment, the data health monitoring system 110 includes a collection system 310, a measurement system 320, an expectation system 330, and an alerting system 340. These subsystems of the data monitoring system 110 may components of a single device, or may be separated devices connected to each other (e.g., via the network 140). In some embodiments, the data monitoring system 110 may further include and/or be connected to a data repository 350.

The collection system 310 may be a computing device or component (e.g., software or hardware engine or module) configured to collect data from the one or more data sources 120. The collection system 310 is an intake point of the data monitoring system 110. The collection system 310 receives data and is configured to route the data throughout the data monitoring system 110 to enable the analysis functions of the data monitoring system 110. The collection system 310 may perform filtering, categorization, and/or scoring of the data to allow for efficient processing.

In one example, the collection system 310 collects data from a variety of data sources 120. These data sources 120 may include, for example, healthcare record-keeping systems (e.g., medical records, charts, etc.), measurement systems and/or test result systems (e.g., laboratory software, medical device systems), and personal devices and systems (e.g., mobile devices, calendars, location tracking, banking systems, insurance systems). The collection system 310 may provide the collected data to the data repository 350 for storage and recall.

The measurement system 320 may be a computing device or component (e.g., software or hardware engine or module) configured to analyze data collected by the collection system 310 and provide a measurement for one or more parameters. The term "measurement" does not limit the data to amounts or values that are physically measured; the term encompasses any information that is representative of a particular parameter based on some collection technique, including narrative text. The "measurements" are not limited to numbers and could be characterized by words, such as in the case of a medical code, illness name, individual name, etc. For example, the measurement system 320 may produce measurements for an amount of data, such as the number of office visits, tests completed, data entries, number of new patients, etc. In another example, the measurement system 320 may produce measurements for values of data, such as an average blood pressure result, heartrate, temperature, diagnosis, etc. The measurement system 320 may be configured to maintain and track measurements over time in the data repository 350.

The measurement system 320 may be able to categorize, classify, and extrapolate data to provide a comprehensive data tracking system within the data repository 350. For example, the measurement system 320 may be programmed with correlations between parameters to create new parameters. For example, scheduled patient visits may be combined with insurance or payment data to determine an actual number of patient visits or a percentage of kept appointments.

The expectation system 330 may be a computing device or component (e.g., software or hardware engine or module) configured to review measurements from the measurement system 320 and determine expectations for one or more parameters based on the review. An expectation may be a parameter amount or value that is expected in the future (but has not yet been received) based on known data of previous measurements in the data repository 350. The expectation may include an "acceptable range" that identifies a range within which a future measurement could be expected to fall. The expectation system 330 may use a time-series-analysis technique to determine the expectation for a parameter. For instance, the expectation system may use a running average of past measurements to determine an expectation for future measurements (e.g., using trends).

In another example, the expectation system 330 may use a cognitive software mechanism, such as an artificial neural network to extrapolate past measurements and produce parameter expectations. A comprehensive review of some examples of cognitive software mechanisms and artificial neural networks (often denoted as "deep learning" systems) is available in "Opportunities and Challenges in Developing Deep Learning Models Using Electronic Health Records Data: A Systematic Review" Xiao C, Choi E, Sun J; *Am Med Inform Assoc.* (2018).

In some embodiments, the expectation system 330 may use correlations between parameters to determine an expectation. For example, the expectation system 330 may combine scheduling data, new patient registrations, billing information, and/or other similar parameters to determine an expectation for patient visits in a particular day. Another example would be the expectation of storing 10-million measurements of systolic blood pressure tests in a specific year. An expected correlation would be between the total number of patients with at least one abnormal systolic blood pressure value and an indication either in a narrative note or in a diagnosis code indicating an active hypertension condition.

The alerting system 340 may be a computing device or component (e.g., software or hardware engine or module) configured to provide alerts based on an analysis of expectations produced by the expectation system 330 and measurements from the measurement system 320. For example, the alerting system 340 may compare expectations for a parameter for a future time period to actual measurements for that time period once it occurs. The alerting system 340 may determine whether the measurements meet an expectation threshold to determine whether a data discrepancy exists.

The alerting system 340 is configured to produce an alert whenever an expectation threshold is crossed. For example, if a measurement falls outside of an expectation range, the alerting system 340 may produce an alert and provide the alert to the client terminal 130 for review by a user. The alerting system 340 may produce a dashboard that is presented to a user through the client terminal 130. The dashboard may include a variety of user tools that enable a user to review measurements, expectations, parameters, etc. The user tools may enable a user to interact with the data and produce customized settings, parameters, correlations, etc. The user tools may further enable a user to review alerts and provide feedback, such as dismissing the alert and erroneous or marking the alert as a correct identification of a data collection or retention problem. The expectation system 330, such as through a cognitive software mechanism, may use feedback from a user through the dashboard to enhance expectation calculations.

The data repository 350 may be a database configure to store data. The data repository 350 may be configured to receive data from the collection system 310 and/or from one or more data sources 120 and store the data according to appropriate storage protocols. In some embodiments, the data repository 350 receives data from the data monitoring system 110, such as from the collection system 310. In other embodiments, the data repository 350 receives data from the one or more data sources 120 and is a data supply for the data monitoring system 110.

Figure 4:
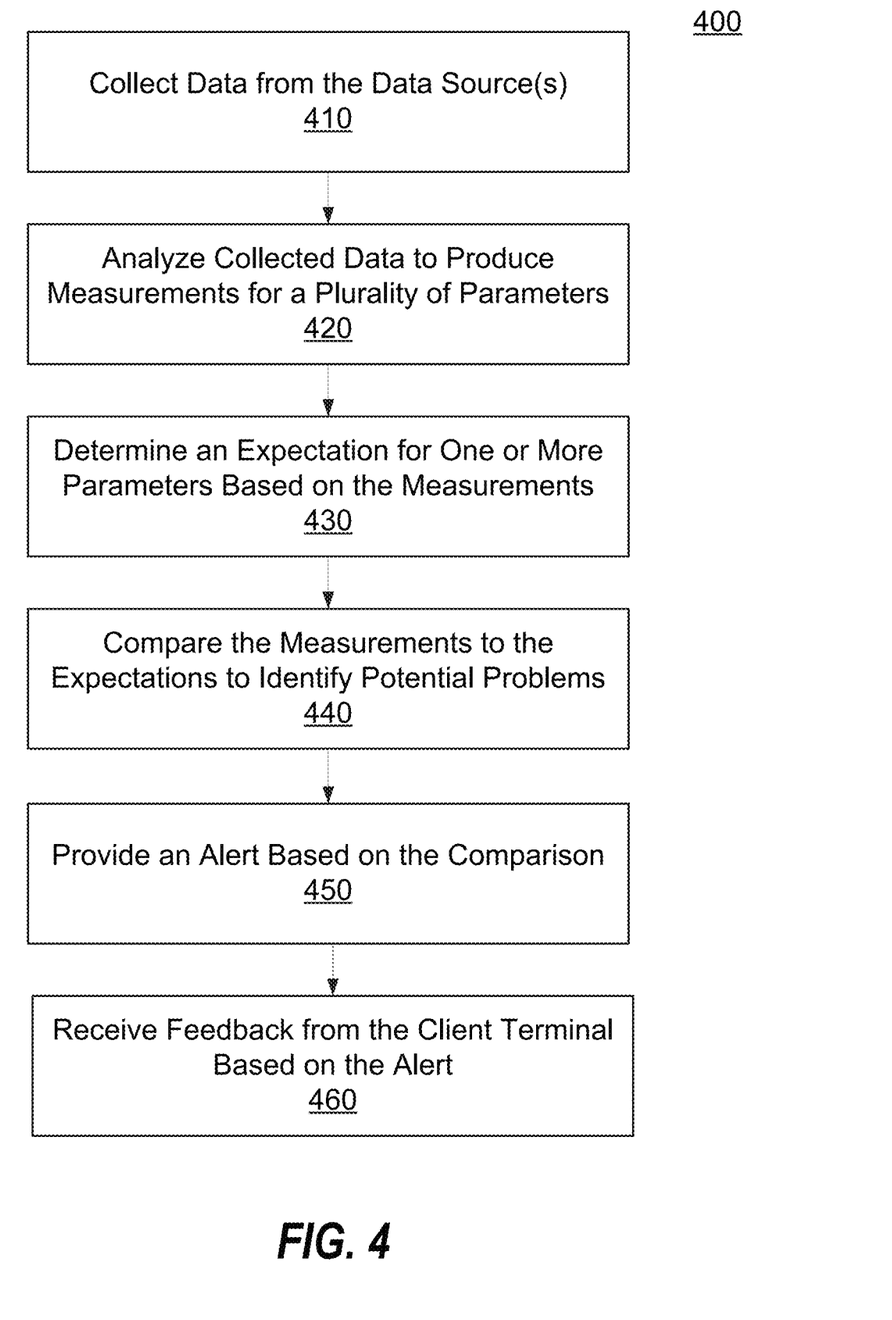
FIG. 4 is a flowchart of an example data health assessment process, according to an embodiment.

FIG. 4 is a flowchart of an exemplary data health monitoring process 400. The data monitoring system 110 may perform one or more steps of the process 400 in order to provide proactive and comprehensive review of data being collected to identify potential issues or discrepancies before they cause a significant deterioration of data storage.

In step 410, data is collected from the data source(s) 120. This step may include the collection system 310 receiving data directly from the one or more data source(s) and storing the raw data in the data repository 350. In another embodiment, the collection system 310 may receive data from the data repository 350. Examples for data sources include electronic health records, administrative data, claims data, disease registries, health surveys, clinical trials data, genetic repositories, as well as data captured from wearables.

In step 420, the collected data is analyzed to produce measurements for a plurality of parameters. For example, the measurement system 320 may perform classification and filtering of the data to categorize the data in a form that is convenient for a time-series-analysis technique. For example, the measurement system 320 may store data with classifier tags such as time, date, location, units, amount/value, relevance score, etc. In one embodiment, the measurement system 320 transforms the raw data into useful measurements. The data repository 350 may store the measurements together with the classifier tags.

In step 430, the expectation system 330 determines an expectation for one or more parameters based on the measurements. The expectation system 330 may determine an expectation for a parameter based on a time-series-analysis technique applied to measurements related to that parameter. The time-series-analysis technique may include using a trend analysis of a plurality of parameters over time to predict a range for a future measurement in one or more related parameters. For instance, the expectation system 330 may review measurements of a number of patient visits over time to determine an expectation for future patient visits.

The expectation system 330 may use correlations and/or AI programming to relate parameters to determine expectations. For instance, a measurement of patient visits, time of year, and number of blood pressure readings may be combined to determine an expectation for a future number of blood pressure readings that are expected for a given period of time.

In step 440, the alerting system 340 compares measurements to expectations to identify potential discrepancies or problems in collected data. For example, the alerting system 340 may receive real-time data measurements from the measurement system 320 (or directly from one or more data sources 120, or as raw data from the collection system 310) and may compare the new measurements to expectations determined by the expectation system 330. In some embodiments, the alerting system 340 may use a threshold or range analysis to determine whether the new measurement is expected or unexpected.

In step 450, the alerting system 340 provides an alert. The alert may indicate that a discrepancy is identified. For example, the alert may indicate that a measurement failed to satisfy a threshold when compared to an expectation. In some embodiments, the alerting system 340 provides a dashboard to the client terminal 130. The alerting system 340 may provide information to that allows the client terminal 130 to generate the dashboard and display it to the user as a user interface. The client terminal 130 may provide an interactive user interface that allows the user to selectively review measurements, expectations, alerts, etc.

In step 460, the alerting system 340 receives feedback from the client terminal 130. For example, a user may review an alert and determine that the alert correctly or incorrectly identified a discrepancy in the collected data. In another example, the alerting system 340 may receive customized information, such as parameters, correlations, settings, etc., that affect how the measurement system 320 produces measurements or the expectation system 330 produces expectations. In some embodiments, the alerting system 340 provides the feedback to the expectation system 330 such that the information can be incorporated into the time-series-analysis technique to improve the accuracy or otherwise enhance the process. For example, the expectation system 330 may utilize an artificial neural network that is constantly updating and improving as more and more comparisons are completed and the collected data set grows.

In some embodiments, the alerting system 340 may be configured to predict the cause of a discrepancy and provide the likely cause as part of the alert. For example, if a particular parameter is missing data for a time period, the alerting system 340 may determine that it is likely that the data has not been entered or collected correctly. If the extra data is found in another area, the alerting system 340 may suggest that the data was stored in an improper location. In cases where parameter values fall outside of expectations, the alerting system 340 may suggest that a medical device should be re-calibrated or checked for potential malfunctioning.

The disclosed embodiments provide a system that scans a variety of health-related data sources that are constantly being stored in a data repository as measurements of various parameters. The monitoring system analyzes the measurements for amount (e.g., data storage completion) and/or value (e.g., actual test results) and alerts in cases where the data is either not being stored as expected, stored mistakenly, or stored in locations other than planned.

The disclosed embodiments have several practical applications, especially in the healthcare field where proper data storage is essential. For example, the disclosed monitoring system is configured to analyze a variety of measurements in real-time and compare the information to constantly-updated expectations to identify discrepancies. Further, the disclosed monitoring system enable the use of a learning AI system such as an artificial neural network that can automatically update and improve analysis techniques over time to improve health assessments of data storage as more data is collected.

In one example, the monitoring system may collect and store all values of systolic and diastolic blood pressure measurements at the time of measurement (SBP and DBP, respectively). The monitoring system considers also elements such as the growth or decrease of the organization's patient population (e.g., by reviewing patient registration parameters, office visits, time of year, illness data, etc.). By applying time-series-analysis techniques, the monitoring system is able to predict, for instance, that the total number of SBP measurements will increase by 4% in 2019, by 8% in 2020, and by 5% in 2021. The monitoring system can then review measurements as they are collected to determine whether they fall within a threshold range around the expectation. For example, if the total number of SBP measurements has decreased after a month into 2019, the system may provide an alert that the measurement is outside of an expectation threshold. This may indicate that SBP measurements are not being collected or stored correctly. The monitoring system can also determine if average daily values of SBP are below or above a quality measure threshold. This allows the monitoring system to alert on situations, for example, where DBP measurements were stored mistakenly as SBP measurements in a given time period.

The present disclosure is not limited to healthcare data and may be applicable to other fields and industries where raw data is collected and measured. For example, fields such as manufacturing, energy production, and financial sectors may benefit from the disclosed analysis techniques for assessing the health of data storage and collection.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for monitoring data storage health in a data processing system that comprising a processor and a memory storing instructions which are executed by the processor, the method comprising:

collecting, by the processor, real-time data from a plurality of data sources, the plurality of data sources include electronic health records, administrative data, claims data, disease registries, health surveys, clinical trials data, genetic repositories, and data captured from wearables;

performing, by the processor, classification and filtering of the collected real-time data and storing the collected real-time data with one or more classifier tags including time, date, location, and relevance score;

determining, by the processor, measurements for a plurality of parameters based on the collected real-time data;

generating expectations, by an artificial neural network, for a future period of time for the plurality of parameters based on the determined measurements and a time-series-analysis technique, wherein the time-series-analysis technique uses a trend analysis of the plurality of parameters over time to predict a range for a future measurement of each parameter of the plurality of parameters;

comparing, by the processor, the expectations for the future period of time to subsequent measurements collected for a period of time to determine whether the subsequent measurements satisfy an expectation threshold to identify potential discrepancies in the collected real-time data;

providing, by the processor, an alert to a client terminal, the alert being a result of the comparison of the expectations and the subsequent measurements and indicating an assessment of data storage health;

receiving, by the processor, feedback from the client terminal via a network, the feedback including an evaluation of the assessment of the data storage health to correct the potential discrepancies; and providing, by the processor, the feedback to the artificial neural network, such that the feedback is incorporated into the time-series-analysis technique to improve an accuracy of generating the expectations.

2. The method of claim 1, wherein at least one data source is a healthcare data source.

3. The method of claim 1, wherein the measurements include amounts for at least some of the plurality of parameters.

4. The method of claim 3, wherein the measurements include patient visit amounts.

5. The method of claim 1, wherein the measurements include values for at least some of the plurality of parameters.

6. The method of claim 5, wherein the measurements include test result values.

7. The method of claim 1, wherein the time-series-analysis technique includes using a moving average to determine a future expected measurement.

8. The method of claim 1, wherein the time-series-analysis technique includes a cognitive software mechanism.

9. The method of claim 1, wherein generating expectations includes using a correlation between two or more of the plurality of parameters.

10. A computer-implemented method for monitoring data storage health in a data processing system that comprising a processor and a memory storing instructions which are executed by the processor, the method comprising:

collecting, by the processor, real-time healthcare data from a plurality of healthcare data sources, the plurality of healthcare data sources include electronic health records, administrative data, claims data, disease registries, health surveys, clinical trials data, genetic repositories, and data captured from wearables;

performing, by the processor, classification and filtering of the collected real-time healthcare data and storing the collected real-time healthcare data with one or more classifier tags including time, date, location, and relevance score;

determining, by the processor, measurements for a plurality of parameters based on the collected real-time healthcare data, the measurements including an amount or value related to patient visits or test results;

generating expectations, by an artificial neural network, for a future period of time for the plurality of parameters based on the determined measurements and a time-series-analysis technique, wherein the time-series-analysis technique uses a trend analysis of the plurality of parameters over time to predict a range for a future measurement of each parameter of the plurality of parameters;

comparing, by the processor, the expectations for the future period of time to subsequent measurements collected for a period of time to determine whether the subsequent measurements satisfy an expectation threshold to identify potential discrepancies in the collected real-time healthcare data;

providing an alert to an end-user device through a dashboard displayable by the client terminal, the alert being a result of the comparison of the expectations and the subsequent measurements and indicating an assessment of data storage health;

receiving feedback from the client terminal via a network, wherein the feedback includes an assessment of whether the alert correctly identified a problem with the collected real-time healthcare data to correct the potential discrepancies; and providing the feedback to the artificial neural network, such that the feedback is incorporated into the time-series-analysis technique to improve an accuracy of generating the expectations.

11. A data monitoring system for assessing data storage health, the data monitoring system comprising a processor and a memory storing instructions which are executed by the processor to cause the processor to:

collect real-time healthcare data from a plurality of healthcare data sources, the plurality of healthcare data sources include electronic health records, administrative data, claims data, disease registries, health surveys, clinical trials data, genetic repositories, and data captured from wearables;

perform classification and filtering of the collected real-time healthcare data and storing the collected real-time healthcare data with one or more classifier tags including time, date, location, and relevance score;

determine measurements for a plurality of parameters based on the collected real-time healthcare data, the measurements including an amount or value related to patient visits or test results;

generate expectations, by an artificial neural network, for a future period of time for the plurality of parameters based on the determined measurements and a time-series-analysis technique, wherein the time-series-analysis technique uses a trend analysis of the plurality of parameters over time to predict a range for a future measurement of each parameter of the plurality of parameters;

compare the expectations for the future period of time to subsequent measurements collected for a period of time to determine whether the subsequent measurements satisfy an expectation threshold to identify potential discrepancies in the collected data;

provide an alert to an end-user device through a dashboard displayable by the client terminal, the alert being a result of the comparison of the expectations and the subsequent measurements and indicating an assessment of data storage health;

receive feedback from the client terminal via a network, wherein the feedback includes an assessment of whether the alert correctly identified a problem with the collected real-time healthcare data to correct the potential discrepancies; and provide the feedback to the artificial neural network, such that the feedback is incorporated into the time-series-analysis technique to improve an accuracy of generating the expectations.

12. The data monitoring system of claim 11, wherein the time-series-analysis technique includes using a moving average to determine a future expected measurement.

13. The data monitoring system of claim 11, wherein the measurements include amounts for at least some of the plurality of parameters.

14. The data monitoring system of claim 13, wherein the measurements include patient visit amounts.

15. The data monitoring system of claim 11, wherein the measurements include values for at least some of the plurality of parameters.

16. The data monitoring system of claim 15, wherein the measurements include test result values.

* * * * *